US006783714B1

(12) United States Patent
Locati

(10) Patent No.: US 6,783,714 B1
(45) Date of Patent: Aug. 31, 2004

(54) METHOD AND PLANT FOR THE PRODUCTION OF PAPER SHEETS HAVING SUBSTANTIALLY STIFF STRUCTURE

(76) Inventor: Giuseppe Locati, Vitale Petrarca 6, 20052 Monza (MI) (IT)

( * ) Notice: Subject to any disclaimer, the term of this patent is extended or adjusted under 35 U.S.C. 154(b) by 47 days.

(21) Appl. No.: 10/130,886

(22) PCT Filed: Nov. 16, 2000

(86) PCT No.: PCT/EP00/11565

§ 371 (c)(1), (2), (4) Date: May 10, 2002

(87) PCT Pub. No.: WO01/38057

PCT Pub. Date: May 31, 2001

(30) Foreign Application Priority Data

Nov. 23, 1999 (IT) ....................................... MI99A02441

(51) Int. Cl.$^7$ ........................... B29B 9/00; B29B 11/12; B29B 13/00; B29B 13/10

(52) U.S. Cl. ....................... 264/115; 264/118; 264/119; 264/120; 264/128

(58) Field of Search ................................ 264/115, 118, 264/119, 120, 128

(56) References Cited

U.S. PATENT DOCUMENTS

| | | | | | |
|---|---|---|---|---|---|
| 4,290,988 | A | * | 9/1981 | Nopper et al. | 264/112 |
| 5,137,668 | A | * | 8/1992 | Lamb, Sr. | 264/112 |
| 5,290,621 | A | * | 3/1994 | Bach et al. | 428/176 |

* cited by examiner

*Primary Examiner*—Stephen J. Lechert, Jr.
(74) *Attorney, Agent, or Firm*—Shlesinger Fitzsimmons & Shlesinger

(57) ABSTRACT

A method and a production plant for production of sheets with substantially stiff structure of paper material comprise the steps of paper grinding to obtain paper flakes, spreading the flakes to obtain a carpet of flakes, sprinkling the carpet with gluing liquid, accomplishing a first compacting of the flakes and accomplishing a second compacting of the carpet during which is executed a simultaneous forming to obtain a sheet with a plurality of stiffening dishes.

9 Claims, 3 Drawing Sheets

METHOD AND PLANT FOR THE PRODUCTION OF PAPER SHEETS HAVING SUBSTANTIALLY STIFF STRUCTURE

This application is a national stage application under 35 U.S.C. § 371 of PCT/EP00/11565, filed Nov. 16, 2000, which claims benefit of Italian Patent Application No. MI99A002441, filed Nov. 23. 1999.

BACKGROUND OF THE INVENTION

The present invention relates to an innovative method and a plant applying this method for the production of sheets of paper material having a substantially stiff structure, e.g. suitable for being used in replacement of the conventional undulated cardboard for the production of boxes, packing and the like.

The present invention also relates to the paper product produced by this method.

In the prior art the so-called undulated cardboard formed from one or more internal layers of undulated paper of different thickness and from flat sheets glued on the two faces of each undulated layer is well known. This structure has the quality of supplying stiffness with minimal use of material. On the other hand production is relatively complicated as it is necessary to produce a normally relatively thick paper by conventional paper production methods. This paper must then be undulated, covered with glue and covered on both faces with flat sheets of other paper which is also produced by conventional methods. Lastly, everything has to be moderately pressed to ensure gluing, cut into panels and allowed to dry. There is accordingly relatively high production complexity which must be undergone to undulate the paper, position it, glue the flat sheets together et cetera. It is always necessary to produce the starting paper with the known problems originating in the conventional paper production.

A feature of undulated cardboard which is sometimes a disadvantage is the different stiffness which it offers in the direction of extension of the undulations with respect to the orthogonal direction. To obviate this, cardboard made up of several undulated layers glued together with the undulations arranged in different directions has been proposed. This further complicates undulated cardboard production. In addition it must be remembered that continuous production is possible only when the undulation is executed with the folds extending transversely to the production line running direction or at best with minimal inclination with respect to said running direction.

The U.S. Pat. No. 5,290,621 discloses the production of individual corrugated wafer board panels made in three steps from wooden fragments combined with thermosetting resin. Of course, this basic material is different from the paper material used in the technical field of the present invention and, according thereto, its behaviour in the manufacturing steps and the features of the final product are quite different.

SUMMARY OF THE INVENTION

The general purpose of the present invention is to remedy the above mentioned shortcomings by making available a paper material in sheets having stiffness comparable to that of undulated cardboard, minimal material expenditure, reduced cost and production ease. Another purpose of the present invention is to make available a production method and plant applying said method.

In view of this purpose it was sought to provide in accordance with the present invention a method for the continuous production of sheets with substantially stiff structure of paper material comprising the steps of paper grinding to obtain paper flakes, spreading the flakes to obtain a carpet of flakes, sprinkling the carpet with gluing liquid, accomplishing a first carpet compression to produce a first compacting of the flakes while holding a virtually flat carpet configuration, accomplishing a second carpet compression to produce another compacting of the flakes, and performing during this second compression a simultaneous forming to obtain a continuous production of a sheet with a plurality of stiffening dishes having an elongated form and arranged in at least two different directions on the sheet expanse.

Again in accordance with the principles of the present invention it was sought to provide a plant for the continuous production of sheets with substantially stiff structure of paper material comprising paper grinding means for obtaining paper flakes, distribution means for spreading the flakes in a uniform layer to form a carpet of flakes, sprinkling means for sprinkling the carpet with gluing liquid, uniform pressing means for subjecting the carpet to a first compression to produce a first compacting of the flakes while holding an essentially flat carpet configuration, and shaped pressing means for subjecting the carpet to a second compression to produce a second compacting of the flakes with the shaped pressing means executing during said second compression a simultaneous shaping to obtain a continuous production of a sheet with a plurality of stiffening dishes having an elongated form and arranged in at least two different directions on the sheet expanse.

Lastly, again in accordance with the principles of the present invention it was sought to provide a sheet with substantially stiff structure of paper material composed of pressed paper flakes, characterized by comprising a plurality of stiffening dishes having an elongated form and arranged in at least two different directions on the sheet expanse.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
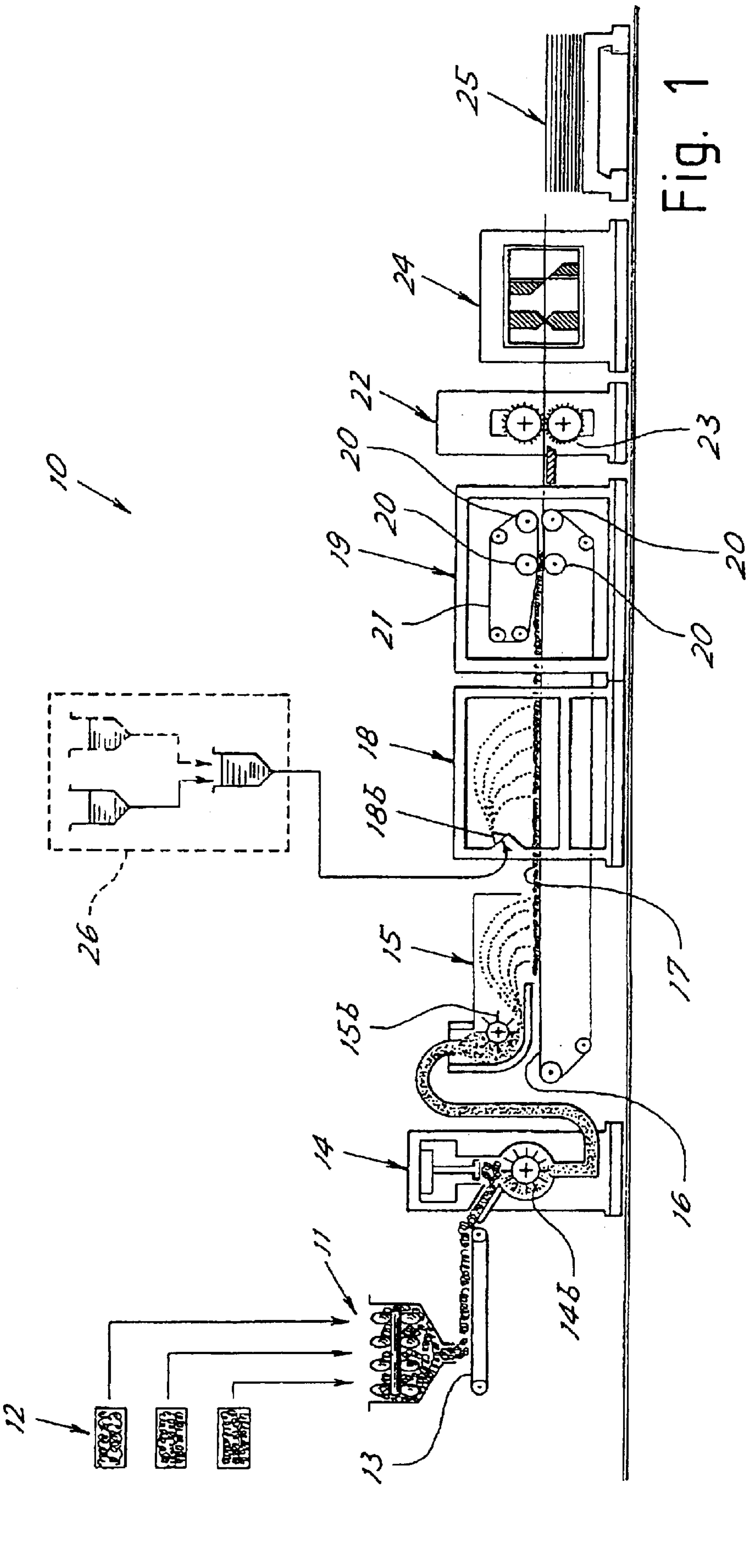
FIG. 1 shows a diagrammatic view of a production plant for paper material in accordance with the present invention.

With reference to the figures FIG. 1 shows a production plant in accordance with the present invention. The plant indicated as a whole by reference number 10 comprises a tank 11 for mixing pulp paper 12 from various sources. The tank unloads onto a conveyor 13 which conveys the paper to grinding means 14 to produce paper flakes i.e. paper particles of small size and "downy" appearance. Advantageously the grinding means is provided by a toothed rotating drum **14*b*** against which the mass of pulp paper is pushed.

The paper flakes emerging from the grinder 14 are conveyed to distribution means 15 which distributes them over a belt conveyor 16 to form a virtually uniform carpet 17.

Advantageously the distribution means comprises rotating blades **15*b*** for lifting and scattering the flakes onto the conveyor belt. This has been found to provide a carpet of flakes well suited to the subsequent processing.

The carpet thus formed passes into a sprinkling station 18 where sprinkling means spray it preferably with an atomized cloud by means of sprinklers 8*b* with gluing liquid coming from a tank 26. The glue can be more or less diluted with water. For example it could be vinyl based.

The sprinkled carpet passes through uniform pressing means made up of a first compacting station 19 in which the carpet is subjected to a first compression to produce a first compacting of the flakes while preserving a virtually flat carpet configuration and thickness reduction.

Advantageously the uniform pressing means comprises pressing rollers 20 arranged facing each other between facing branches of the belt 16 and an upper counter-belt 21.

After this the thinned and compacted carpet is conveyed to a second compacting station 22 where shaped pressing means subjects the carpet to a second compression to produce a second compacting. During the second compression the shaped means performs a simultaneous shaping to obtain a sheet with a plurality of stiffening dishes as clarified below.

The shaped pressing means comprises facing complementary knurled rollers 23 between which runs the carpet emerging from the uniform pressing means.

Figure 2:
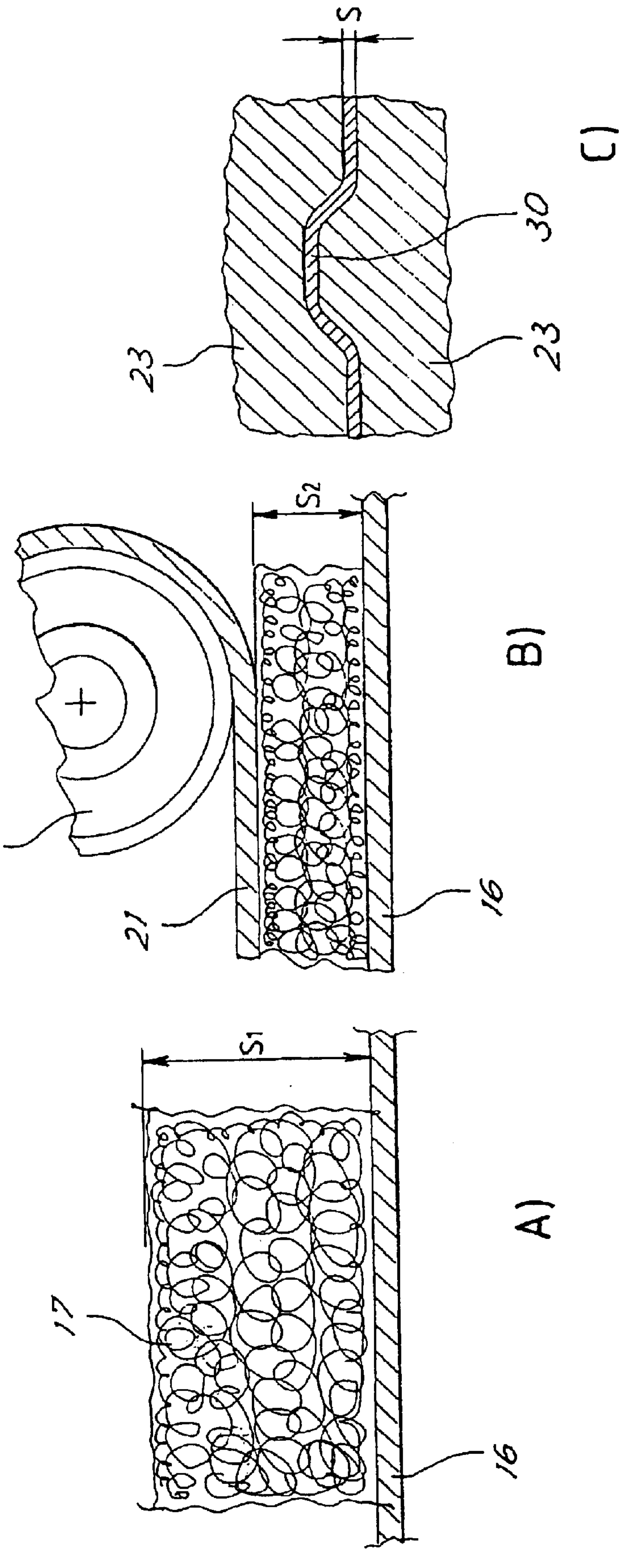
FIG. 2 shows a diagrammatic view of the material processing steps.

The sheet or ribbon thus shaped and taken to its final thickness s can be conveyed to a known etching, folding and cutting station 24 for production of individual sheets which will be stacked in a known stacking station 25. FIG. 2 shows the changes in configuration of the flake carpet during the various steps of the production method carried out by the above mentioned plant. FIG. 2*a* shows the flake carpet of a first thickness $S_1$ between the sprinkling station 18 and the first compacting station 19. FIG. 2*b* shows the carpet reduced to a thickness $S_2$ emerging from the first compacting station 19. During compression the thickness $S_1$ of the paper flake carpet is reduced by at least half and preferably from three to five times the initial thickness to accomplish a first flake compacting so as to obtain a certain cohesion of the carpet.

FIG. 2*c* shows the carpet during passage between the shaped pressing means 23. By this means the material thickness is reduced by at least five more times and preferably from five to ten times to take it to the final thickness S and at the same time shape it as explained below to give it the desired stiffness. The thickness S can be around 2 mm.

Figure 3:
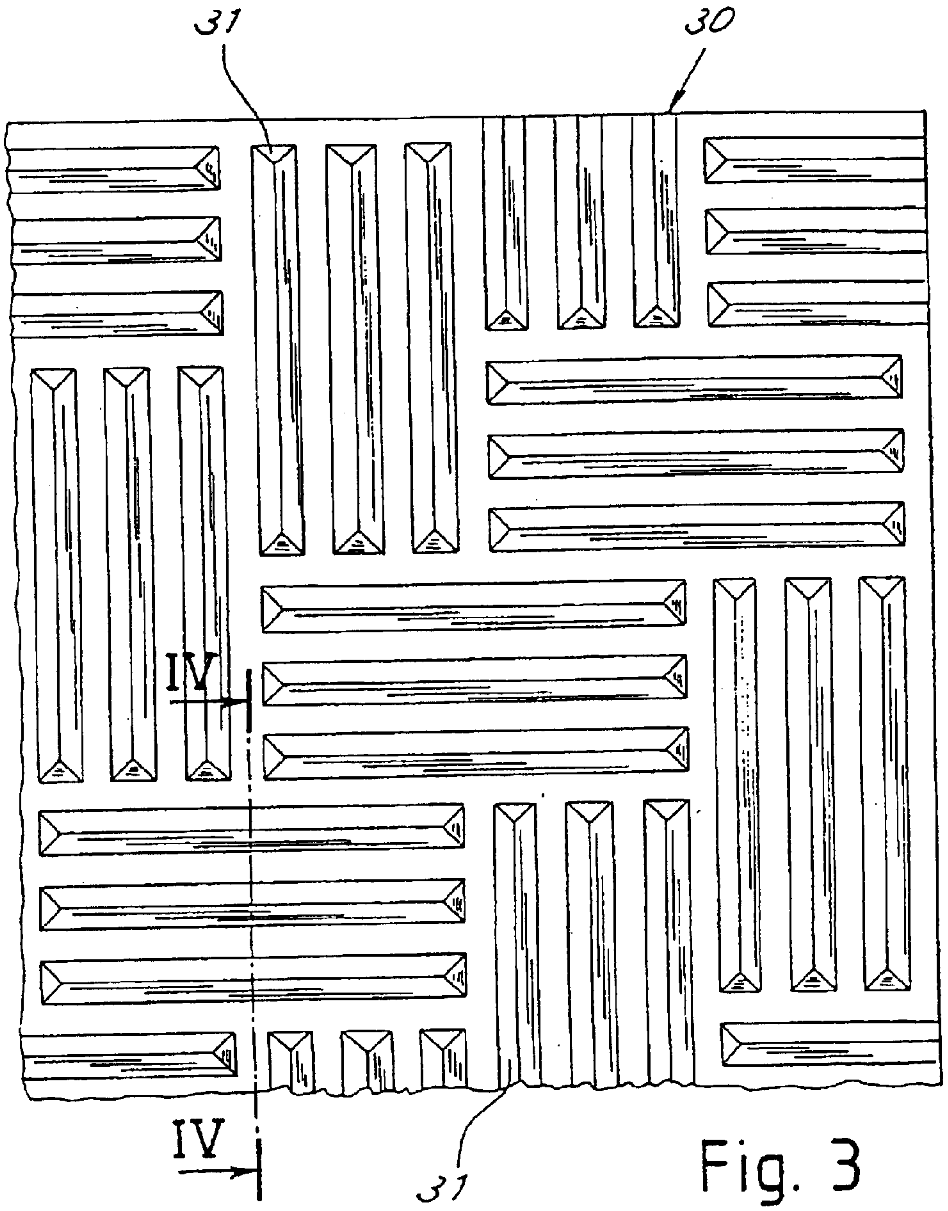
FIG. 3 shows a plan view of a material obtained in accordance with the present invention, and FIG. 4 show a cross section view along plane of cut IV—IV of FIG. 3.
Figure 4:
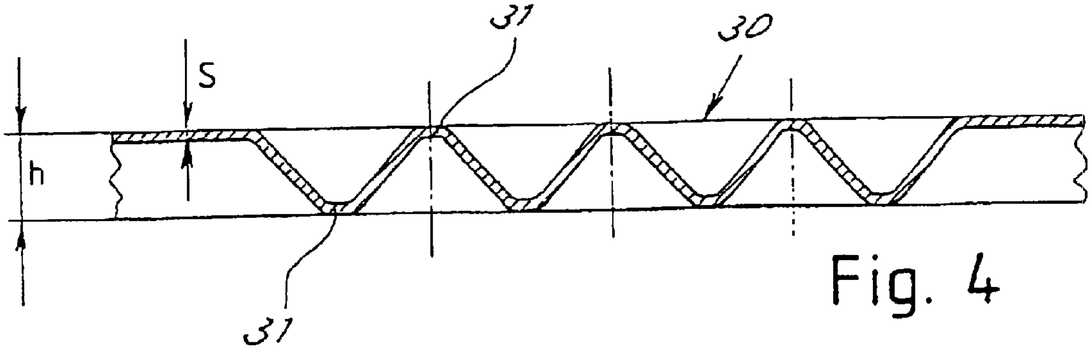

FIGS. 3 and 4 show the preferred configuration of the sheet 30 obtained. This configuration was found particularly advantageous for securing satisfactory sheet stiffness with reduced material employment.

As may be seen in FIG. 3 the sheet obtained has a plurality of dishes 31. The dishes have an elongated form and are arranged in at least two different directions on the sheet expanse. Advantageously the two different directions are at right angles to each other and the dishes are gathered in groups made up e.g. of three dishes each. The dishes of each group are arranged side-by-side and parallel and the groups are arranged directed in the said two directions along zigzag lines in such a manner as to not define preferential straight folding lines through the sheet expanse.

As may be seen in FIG. 4 the generally trapezoid dishes have height h equal to at least four times thickness S of the sheet and advantageously at least six times.

It is clear from FIGS. 2, 3 and 4 that the knurled rollers 23 must reproduce complementarily on their own surface hollows and protuberances as shown in FIGS. 3 and 4 with spacing approximately equal to S between the two rollers.

It is now clear that the predetermined purposes have been achieved.

Surprisingly it has been found that with the proposed method it is possible to perform deep dishing of a paper product without tearing it to obtain a relatively thin sheet but with satisfactory resistance to deformation to be used in replacement of the conventional undulated cardboard e.g. for making boxes. The "flaked" structure allows running of the material during shaping to avoid tearing the compressed and thickened carpet.

It has been found that the first partial thickening gives the carpet a consistency and deformability such as to ensure uniform distribution of the material in the pits which mark out the subsequent drawing. In this step it is important that the material not thicken in the bottom of the pits since it does not have fluid behaviour and there would remain zones outside the bottom of the pit with minimal density and hence insufficient resistance.

On the contrary, if it were attempted to draw the pressed carpet to its final thickness, tearing would be produced due to insufficient plastic deformability of the material.

The dish obtained in accordance with the present invention is preferably deep i.e. with forming of protuberances having a dimension measured orthogonally to the sheet a multiple of the material thickness.

Naturally, the above description of an embodiment applying the innovative principles of the present invention is given by way of non-limiting example of said principles within the scope of the exclusive right claimed here. For example, the dishes could also be only partially intersecting to be non-rectilinear but with undulating pattern.

What is claimed is:

1. Method for the continuous production of sheets with substantially stiff structure of paper material comprising the steps of:

paper grinding to obtain paper flakes, spreading the flakes to obtain a carpet of flakes, sprinkling the carpet with gluing liquid, accomplishing a first carpet compression to produce a first compacting of the flakes while holding a virtually flat carpet configuration, accomplishing a second carpet compression to produce another compacting of the flakes, and performing during this second compression a simultaneous forming to obtain a continuous production of a sheet with a plurality of stiffening dishes having an elongated form and arranged in at least two different directions on the sheet expanse.

2. Method according to claim 1 wherein during the first compression the carpet thickness is reduced by at least half.

3. Method according to claim 1 wherein during the second compression the carpet thickness is reduced by at least five times.

4. Method according to claim 1 wherein said at least two different directions comprise two directions that are orthogonal to each other.

5. Method according to claim 1 wherein the dishes are arranged in parallel side-by-side groups directed in said at least two different directions along zigzag lines to prevent formation of preferential straight folding lines through the sheet expanse.

6. Method according to claim 1 wherein the dishes have a height substantially a multiple of the sheet thickness.

7. Method according to claim 1 wherein during the first compression the carpet thickness is reduced from three to five times.

8. Method according to claim 1 wherein during the second compression the carpet thickness is reduced from five to ten times.

9. Method according to claim 1 wherein the dishes have a height that is at least four times the sheet thickness.

* * * * *